Sept. 6, 1966      C. A. LUKE      3,270,970

AUTOMATIC COIL WINDER

Filed Nov. 26, 1963      3 Sheets-Sheet 1

CHESTER A. LUKE
INVENTOR.

BY

*Robert K. Rhea*

AGENT

Sept. 6, 1966

C. A. LUKE 3,270,970

AUTOMATIC COIL WINDER

Filed Nov. 26, 1963

CHESTER A. LUKE
*INVENTOR.*

BY

*Robert K. Shea*

AGENT

CHESTER A. LUKE
*INVENTOR.*

BY

*Robert K. Rhea*
AGENT 3,270,970
AUTOMATIC COIL WINDER
Chester A. Luke, 1124 St. Charles, Oklahoma City, Okla.
Filed Nov. 26, 1963, Ser. No. 325,996
5 Claims. (Cl. 242—9)

The present invention relates to coil winding machines.

In the art of coil winding it is frequently desirable to wind a coil group comprising a plurality of coils, each coil of the group having identical or a different number of turns on the same core or arbor. It is, also, desirable in coil winding machines to provide a means for winding a plurality of such coil groups without resetting the machine.

The principal object of the instant invention is to provide an automatic coil winding machine which will wind a selected number of turns of magnet or coil wire on a coil form and thereafter wind an additional number of coils on the coil form having the same or a different number of turns to form a coil group without resetting the machine.

Another object is to provide a coil winding machine which includes a motor which rotates a head or chuck engaging an end of a coil form in combination with counter means which controls the number of revolutions of the coil form.

Another object is to provide a machine of this class which contains a coil winding and counting selector means which may be preset for winding a selected number of coil groups wherein the respective individual coils of each group have the same number of turns of coil wire.

Another object of the invention is the provision of a coil winding apparatus in which the controls are predominantly electrically controlled.

Another important object is to provide a coil winding apparatus which, after being initially set to predetermined settings, the operator need only remove finished coils of a predetermined value.

Still another object is to provide a coil winding machine which is manually and electrically controlled in such a manner that the coil winding operation can be interrupted and instantly stopped in case of malfunction of any part of the apparatus.

Yet another object is to provide a coil winding machine wherein the coil turn counting selector means retains the fed-in coil winding data until it is manually cancelled.

The present invention accomplishes these and other objects by mounting a coil form holding head on a motor driven spindle supported by a frame and connecting a counting selector means with an indexing shaft geared to the spindle. Manual control means connected with an electrical circuit provides manual starting and automatic electrical stopping of the motor in response to a predetermined setting of the counting selector means.

Other objects will be apparent from the following description when taken in conjunction with the accompanying three sheets of drawings, wherein.

Like characters of reference designate like parts in those figures of the drawings in which they occur.

In the drawings.

Figure 2:
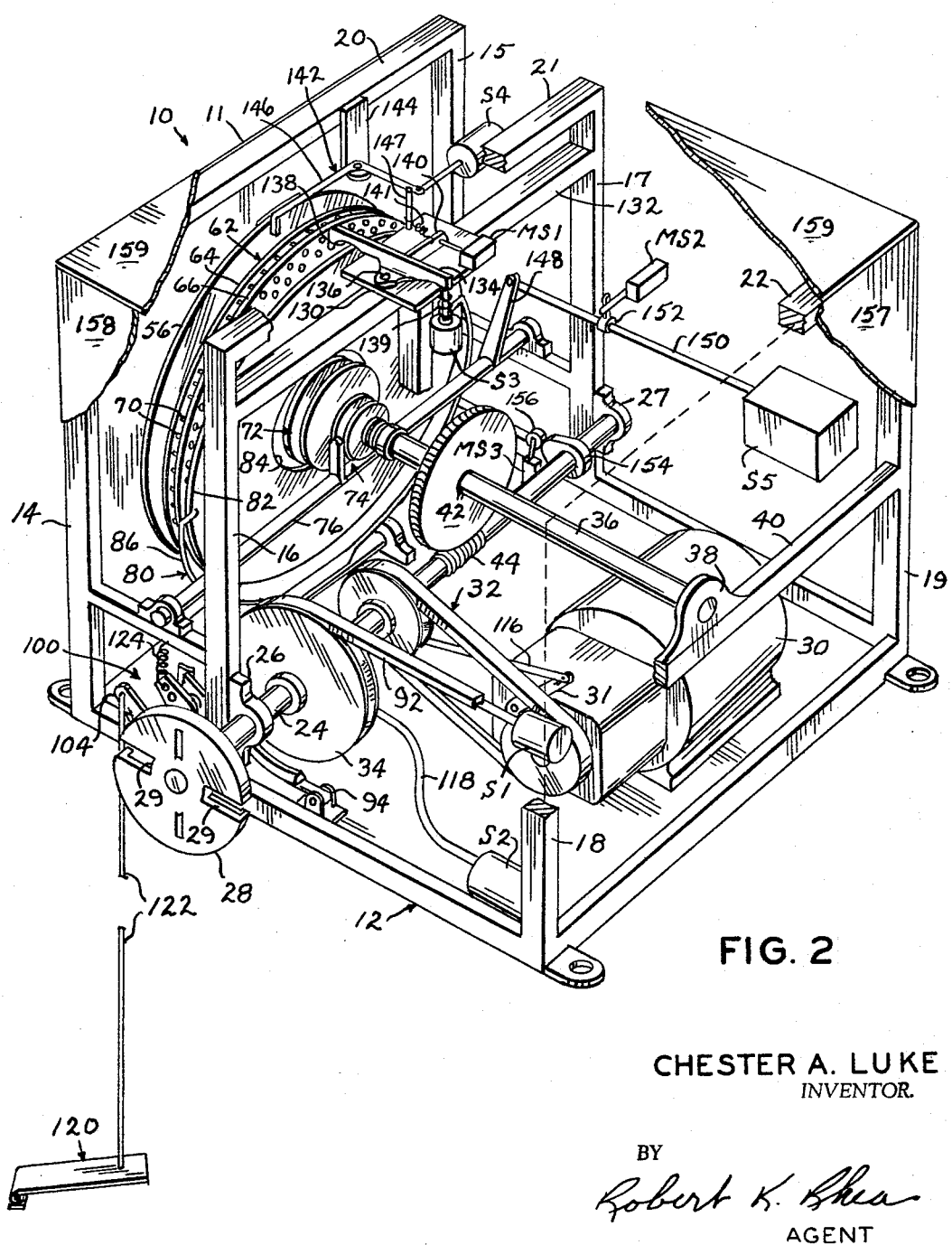
FIGURE 2 is a perspective view thereof with parts of the frame covering and supports broken away for clarity.
Figure 3:
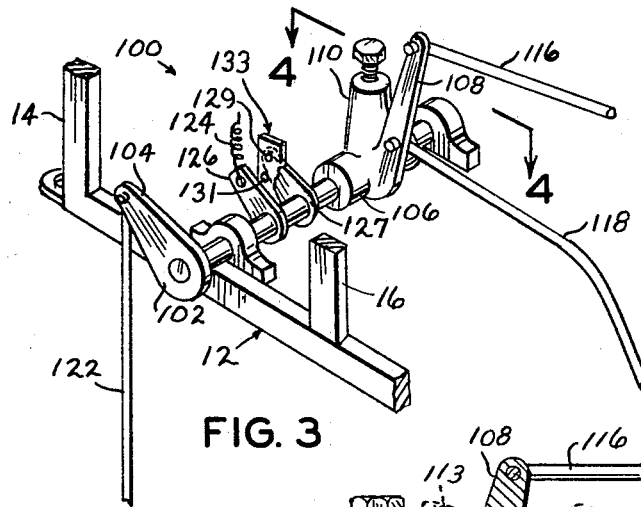
FIGURE 3 is a fragmentary perspective view, to a larger scale, of a portion of the control means.
Figure 4:
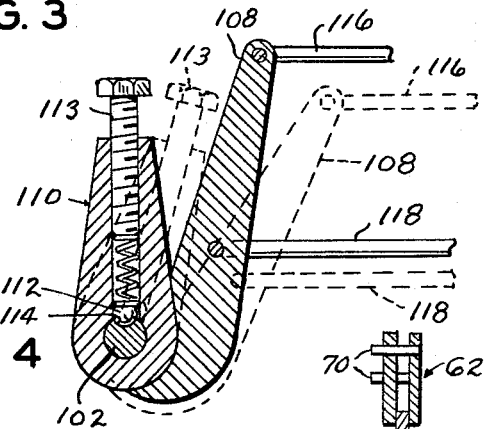
FIGURE 4 is a vertical cross-sectional view taken substantially along the line 4—4 of FIG. 3.

Referring more particularly to FIG. 2 the reference numeral 10 indicates a rectangular frame having a base 12 and a plurality of uprights or supports 14, 15, 16, 17, 18 and 19, connected thereto. Horizontal members 20, 21 and 22 interconnect the upper ends of the supports 14–15, 16–17 and 18–19, respectively to complete the frame 10. The front or forward end of the frame is covered by a front panel 11. A shaft or spindle 24 is horizontally mounted on the supports 16 and 17 by bearings 26 and 27. One end of the spindle 24 extends outwardly of one side of the frame and is rigidly connected with a coil form holding head 28. The head 28 is characterized by a pair of opposing radial outwardly open slots 29.

A variable speed motor 30, having a speed control arm 31, is mounted on the base 12 and is connected to the spindle 24 by pulley and belt means 32. A V-belt or brake pulley 34 is axially connected to the spindle 24 between the pulley and belt means 32 and the bearing 26. A driven or indexing shaft 36 is horizontally mounted by bearings 38, only one being shown, within the frame above and perpendicular with respect to the axis of the spindle 24. A frame cross member 40 supports the rearwardmost bearing 38. The index shaft 36 extends forwardly toward the front end panel 11. A worm wheel 42, axially connected to the shaft 36, is engaged with a cooperating worm gear 44 on the spindle 24. The forward end of the index shaft 36 terminates rearwardly of the forward end panel 11.

Figure 5:
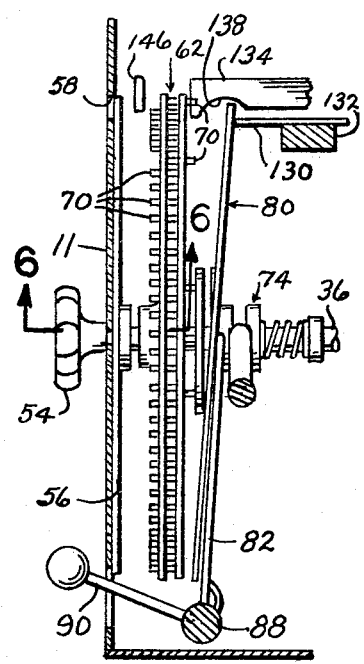
FIGURE 5 is a vertical cross-sectional view taken substantially along the line 5—5 of FIG. 1.
Figure 6:
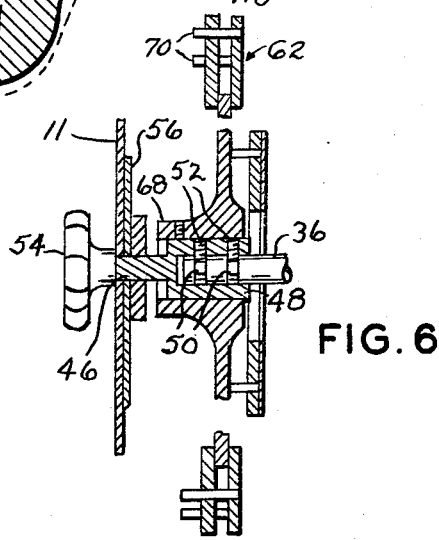
FIGURE 6 is a fragmentary horizontal cross-sectional view taken substantially along the line 6—6 of FIG. 5; and, FIGURE 7 is a wiring diagram.

Referring, also, to FIGS. 5 and 6, a stub shaft 46 extends through the forward end panel 11 coaxial with respect to the shaft 36. The rearward end portion of the stub shaft 46 is circumferentially enlarged, as at 48 (FIG. 6), and counterbored for freely receiving the adjacent forward end portion of the shaft 36. A pair of circumferential grooves 50, formed in the forward end portion of the shaft 36 within the counterbored end 48 of the stub shaft, cooperatingly receive a pair of set screws or pins 52 which permits independent rotation of the stub shaft 46 with respect to the shaft 36 at selected intervals as more fully explained hereinbelow.

A dial setting handle or knob 54 is axially connected to the end of the stub shaft 46 projecting forwardly of the frame front panel 11. A counting selector dial 56 is secured to the stub shaft 46 rearwardly of the front panel 11. The dial 56 is provided with a circumferential series of numbered calibrations. The spacing between any two scored lines of the calibrations indicating one complete revolution of the winding head 28. An opening 58, formed in the panel 11, permits indicia and the calibrations on the forward surface of the selector dial 56 to be visually aligned with a center line 60 for feeding coil winding information to a counting or coil winding pinwheel selector memory unit 62 in a manner hereinafter set forth.

The counting selector memory unit 62 comprises a pinwheel assembly, such as is conventionally used in selecting records in a record player. The pinwheel unit 62 is diametrically equal with respect to the dial 56 and includes a pair of parallel spaced-apart ring-like disks 64 and 66 mounted on opposing side surfaces of a flange integrally formed on a hub 68 secured to the periphery of the enlarged portion 48 of the stub shaft 46 so that the pinwheel unit 62 rotates with the counting selector dial 56. The disks 64 and 66 are provided with a pair of circumferential rows of equally spaced counter pins 70 arranged in off-set or staggered relation transversely slidable through the disks. The total number of the pins 70 is equal to the sum of the calibrations on the dial 56. In other words there is a pin 70 corresponding to each numbered calibration on the dial 56. The counter pins 70 are movable within their respective mounting holes to project rearwardly of the surface of the rearward disk 66 to feed or store coil winding counting information into the pinwheel memory unit 62 as will be more fully explained.

Friction disk clutch means 72 comprising a pair of disks one disk being connected to the pinwheel 62 and the other disk being connected to the shaft 36 rotates the pinwheel 62 with the shaft 36. The clutch means includes a clutch control yoke assembly 74 mounted on a bearing equipped shaft 76 extending transversely of the frame rearwardly of the pinwheel unit 62 for releasably engaging the friction disks. Obviously other type clutch units may be employed if desired.

Pinwheel pin setting cancelling means 80 is positioned rearwardly of the pinwheel 62 and around the clutch 72 for moving all rearwardly extending pins 70 into the pinwheel unit at selected intervals. The pin setting cancelling means 80 includes a ring disk 82 circumferentially substantially equal with respect to the pinwheel unit 62 having a central bore 84 loosely surrounding the clutch means 72 so that the forward surface of the ring 82 contiguously contacts the rearward surface of the pinwheel disk 66 when positioned thereagainst. The disk 82 is diametrically mounted for forward and rearward movement by a yoke-arm 86 secured to a bearing supported horizontal shaft 88 mounted on the base 12 below the pinwheel unit 62. A lever 90, connected with the shaft 88 projects forwardly of the frame panel 11, through a suitable slot, for manually moving the disk 82 into contact with the rearward surface of the pinwheel disk 66. A V-belt brake band 92 surrounds the brake pulley 34 and is pivotally connected at one end to the base 12, as at 94, and is connected at its other end to a frame mounted solenoid S1.

Brake and motor control means 100 are mounted on the base forwardly of the brake pulley 34. The control means 100 includes a bearing equipped horizontal shaft 102 mounted on the base and projects outwardly of the frame at one end parallel with respect to the spindle 24 and is provided with a foot pedal lever or arm 104 secured thereto. A hub 106 is mounted on the shaft 102. An upstanding control arm 108 is rigidly secured to the hub 106. The hub 106 is provided with a centrally drilled upstanding boss 110 receiving a spring urged ball 112 which moves into and out of a detent 114 formed in the periphery of the shaft 102 in a manner hereinafter explained in more detail. A set screw 113 adjusts the force applied by the spring to the ball 112.

The upper end portion of the control arm 108 is connected to the motor control arm 31 by a motor control link 116. A second or brake control link 118 is connected at one end to the control arm 108 intermediate its ends and is connected at its other end to a solenoid S2 mounted on the frame base 12. The free end of the pedal arm 104 is connected to a foot pedal 120 by a cable or link 122. A spring 124, connected at one end to the frame and connected at its other end to a retracting arm or ear 126 secured to the shaft 102, normally maintains the foot pedal arm 104 in upward or retracted position and the motor speed control arm 31 in power "off" position.

An adjustable wiper arm 127 is mounted on the shaft 102 for contact with vertically spaced electrical contacts 129 and 131 fixed on an upright switch post 133 mounted on the base for the reasons presently set forth.

A rectangular plate 130 is horizontally mounted rearwardly of the pinwheel 62 and disk 80 on a frame cross brace 132. The plate 130 forms a stop limiting the rearward movement of the disk 80. A counting control arm or finger 134 is pivotally mounted loosely, intermediate its ends, on the upper surface of the plate 130, by a pin 136. The aperture in the finger 134 surrounding the pin 36 is substantially greater diametrically than the diameter of the pin 136 and the length of the pin 36 is greater than the combined thickness of the finger 134 and plate 130 so that the finger 134 may pivot horizontally and vertically. This movement is limited by the components with which it operates as will presently be apparent. The finger 134 extends forwardly of the plate 130 and terminates abruptly in closely spaced relation with respect to the adjacent peripheral portion of the rearward surface of the pinwheel disk 66. The depending surface of the forward end portion of the finger 134 is arcuately curved upwardly, as at 138, so that a peripheral portion of the cancelling disk 80 lifts the forward end portion of the arm 134 out of pinwheel pin contact when the cancelling disk 80 is moved into contact with the pinwheel disk 66. The rearward end portion of the finger 134 is connected with a solenoid S3 for vertical pivoting movement of the finger to release the latter from contact with one of the pins 70 as will presently be explained. The solenoid 53 is mounted on the frame so that its upper end portion may tilt, laterally, toward the supports 16 and 17, respectively, in response to horizontal movement of the finger 134 as presently explained. A spring 139, interposed between the solenoid S3 and the finger 134, normally maintains the latter in pinwheel pin contacting position. A laterally projecting arm or wing 140, secured to the finger 134, is positioned for contacting the switch arm of a frame supported micro switch MS1.

A bell crank 142 is connected to a frame bracket 144, depending from the cross member 20, so that one leg 146 of the crank extends toward the vertical center of the upper peripheral portion of the forward surface of the pinwheel 62 for effecting rearward movement of selected ones of the pins 70. The other leg of the crank 142 is pivotally connected to a frame mounted solenoid S4. An upright rod-like post 147 is mounted on the plate 130 and forms a stop limiting the movement of the free end of the crank leg away from the pinwheel 62.

Figure 7:
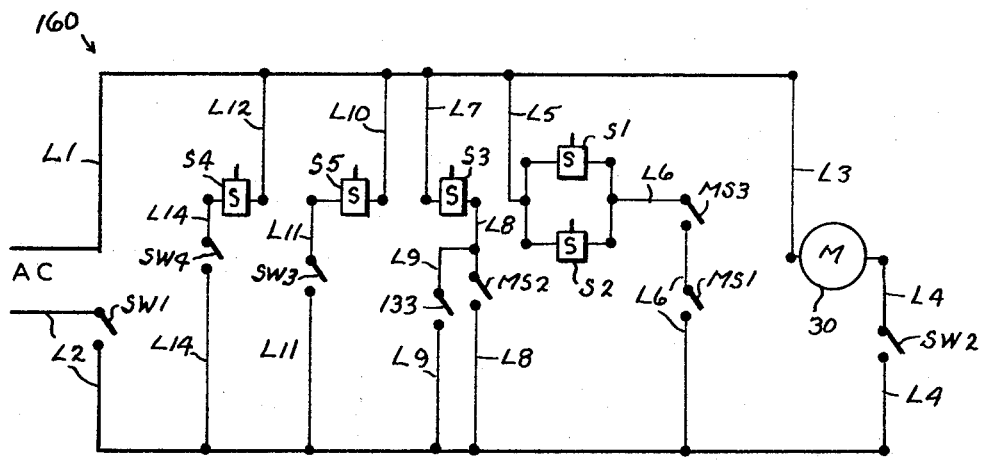

A clutch control lever 148 is connected with a frame mounted solenoid S5 by a link 150. An adjustable stop 152 is connected with the link 150 for contact with the switch arm of a micro switch MS2. A cam 154 is adjustably secured to the spindle 24 for engaging a roller contact 156 of the switch arm of a frame supported micro switch MS3. An off-on switch SW1, mounted on the front panel 11, energizes an electrical circuit 160 (FIG. 7) while a motor control switch SW2, mounted on the panel 11, applies current from a source of electrical energy, not shown, to the motor 30. A clutch release reset switch SW3 and a pinwheel dial reset pinwheel pin actuating switch SW4 are similarly mounted on the panel 11.

The rearward end, sides and top of the frame are preferably covered by closure panels fragmentarily illustrated in FIG. 2 as at 157, 158 and 159.

Referring now to the wiring diagram (FIG. 7), wires L1 and L2 are connected with a source of alternating current, not shown. The switch SW1 is interposed in the wire L2. The motor 30 is connected to wires L1 and L2 by wires L3 and L4 through the switch SW2. One side of the brake and motor solenoids S1 and S2, respectively, are connected in parallel to the wire L1 by a wire L5. Similarly a wire L6 connects the other side of the solenoids S1 and S2 to the wire L2 through the micro switches MS1 and MS3 interposed in series in the wire L6. One side of the finger lift solenoid S3 is connected to the wire L1 by a wire L7. The other side of the solenoid S3 is connected to the wire L2 by a wire L8 through the micro switch MS2. A second wire L9, connected with the wire L2, is connected to the wire L8 between its connection with the solenoid S3 and the micro switch MS2 through the switch post 133. One side of the clutch solenoid S5 is connected to the wire L1 by a wire L10. The other side of the solenoid S5 is connected to the wire L2 by a wire L11 through the clutch releasing switch SW3. The pin setting solenoid S4 is connected to wires L1 and L2 by wires L12 and L14 through the pin setting switch SW4.

*Operation*

As an example of the operation of the device the winding of a coil group comprising three coils of twelve, seventeen and twenty-three turns, respectively, will be described. The winding head 28 must be positioned with its radially open slots 29 horizontal. A conventional coil winding form, not shown, is connected to the head 28. The current source switch SW1 is closed. Switch SW3 is manually held closed energizing solenoid S5 which releases the clutch means 72 by moving the arm 148 and link 150. As explained hereinabove, this permits rotation of the stub shaft 46, dial 56 and pinwheel 62 as a unit and independent of the index shaft 36. The selector dial 56 is manually rotated by the control knob 54 until the first coil setting, indicated by the calibration numbered twelve, is aligned with the indicator 60. Switch SW4 is closed energizing solenoid S4 which moves the bell crank leg 146 into contact with a pin 70 corresponding to the count of twelve to move the pin so that its rearward end projects rearwardly of the disk 66. Switch S4 is then opened and the selector dial 56 rotated to the next coil count twenty-nine (twelve plus seventeen). Switch S4 is again closed to move the corresponding pin 70 rearwardly. Similarly the pin 70 corresponding to the calibrated position fifty-two is actuated for the twenty-three turns of the third coil of the group. The dial indicator or disk 56 is then rotated to zero position and the dial reset switch SW3 is released de-energizing solenoid S5 and engaging the clutch 72. Coil winding data for a coil of three units is now locked in the pin wheel 62 and remains until cancelled as hereinafter described.

Figure 1:
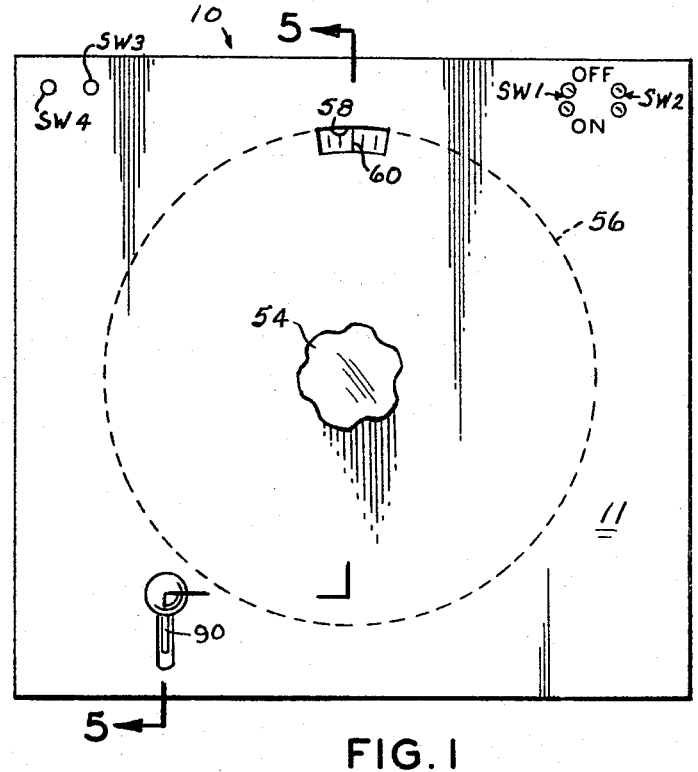
FIGURE 1 is a front elevational view of the device.

The magnet wire, not shown, is placed in the proper slot of the coil form and manually held to guide and tension the wire. Switch SW2 is closed to energize the motor 30. The foot pedal 120 is manually depressed which rotates the shaft 102 moving the control arm 108 and motor control arm 31 for the desired speed, ranging from zero to maximum of the motor. This rotates the spindle 24 and head 28 by the belt and pulley means 32 while the worm 44 drives the worm gear 42, rotating the index shaft 36 and the pinwheel unit 62 in a counter-clockwise direction as viewed from the front of the device 10 (FIG. 1). When the spindle 24 has rotated twelve times, pin 70, corresponding to the twelve turn setting, contacts the finger 134, pivoting it horizontally about the vertical axis of its mounting pin 136, moving its wing 140 into contact with and closing the micro switch MS1, connected in series with micro switch MS3, which latter is closed by the cam 154. Solenoid 53, connected with the finger 134, stops the horizontal pivoting movement of the latter after allowing the finger wing 140 to close the micro switch MS3. This circuit simultaneously energizes solenoids S1 and S2 moving control arm 108 rearwardly and stopping the motor 30 and applying the brake 92 by movement of the link 116 connected with the motor control arm 31. Cam 154 is positioned on the spindle 24 so that its closing stops the rotation of the spindle 24 with the winding head slots 29 positioned horizontally as shown in FIG. 2. Movement of the control arm 108 by the solenoid S2, while the pedal arm 104 is positioned downwardly, is accomplished by the solenoid S2 forcing the ball 102 upwardly against its seating spring and out of the detent 114 when the arm 108 and hub is rotated about the longitudinal axis of the shaft 102. The magnet wire is crossed over on the control form for the next coil winding as is conventional. The foot pedal 120 is released allowing the spring 124 of the control means 100 to raise the pedal arm 104 rotating the shaft 102 and allowing the spring loaded ball 112 to again engage the detent 114 in the shaft 102. When the pedal arm 104 is released the wiper arm 127 also moves upwardly and momentarily makes contact across the points 131 and 129 on the post 133. This energizes solenoid S3 and vertically pivots the finger 134 to lift its forward end portion out of contact with the actuating pinwheel pin 70. A spring 141, connected to the finger wing 140 and rod post 147, pivots the finger 134 horizontally to its normal position which opens the micro switch MS1 and interrupts the current to the solenoids S1 and S2. Depressing the foot pedal 120, rotating the shaft 102 again moves the wiper arm 127 into contact with the points 129 and 131 re-energizing solenoid S3 to again lift the forward end of the finger 134 thus insuring that the latter is clear of the actuated pin 70. The depression of the foot pedal 120, rotating shaft 102, moves the motor control arm 31 and rotates the head 28 thus completing one cycle of operation.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A coil winding machine, comprising: a frame; a spindle journaled by the frame and projecting outwardly of the frame at one end; a coil form holding head secured to the outwardly projecting end of said spindle; a variable speed motor drivably connected with said spindle; brake means on said spindle; a cam on said spindle; an indexing shaft journaled by the frame; gears connecting said index shaft to said spindle; pinwheel counting means supported by the frame coaxial with respect to said index shaft; clutch means interconnecting said index shaft and said pinwheel means; control means within the frame and having a control arm connected with said motor; and electrical components connected with a source of electrical energy for stopping said motor at a predetermined setting of said counting means, said electrical components including a solenoid operatively connected with said brake means and said control arm, a first normally open switch closed by the rotation of said counting means at a predetermined setting, a second normally open switch connected in series with said first switch and closed by said cam completing a circuit with a source of electrical energy and energizing the solenoid connected with said control arm.

2. A coil winding machine, comprising: a frame; a spindle journaled by said frame; a coil form holding head connected to one end of said spindle outwardly of said frame; a variable speed motor drivably connected with said spindle; brake means connected with said spindle; a cam on said spindle; a first solenoid connected with said brake means; a control arm pivotally mounted on said frame; a second solenoid; links interconnecting said control arm with said motor and said second solenoid respectively; an indexing shaft journaled by said frame; gears interconnecting said index shaft and said spindle; a pinwheel counting unit supported by said frame coaxial with said index shaft; clutch means connecting said index shaft to said counting unit, said pinwheel counting unit having at least one disk supporting a series of pins selectively movable inwardly and outwardly of a surface of said disk; a pinwheel counting unit pin contacting finger supported by said frame and having an end releasably engageable with selected ones of said series of pins; a normally open switch supported by said frame and closed by the movement of said finger when contacted by a predetermined one of said series of pins; a second normally open switch connected in series with said first switch and closed by said cam in cooperation with said finger; and an electrical circuit interconnecting said solenoids and said switches with a source of electrical energy for stopping the rotation of said spindle in response to the simultaneous closing of said first and said second switches.

3. A coil winding machine, comprising: a frame; a spindle supported by said frame and adapted to rotate a coil form holding head; a motor; a belt and pulley means connecting said motor to said spindle; an indexing shaft; worm gears connecting said spindle to said indexing shaft; spindle rotation counting means coaxially mounted with respect to said indexing shaft; clutch means connecting said counting means to said indexing shaft; brake means mounted on said spindle; and control means connected with said motor and said brake means for stopping said motor and said spindle in response to a predetermined setting of said counting means; said control means including a solenoid connected with said brake means, a cam on said spindle, a first normally open switch closed by said counting means in response to a predetermined number of revolutions of said spindle, a second normally open switch closed by said cam, and wiring connecting said first and second switches and said solenoid in series with a source of electrical energy, whereby said solenoid is energized to actuate said brake means and stop said spindle when said first and second switches are simultaneously closed.

4. A coil winding machine, comprising: a frame; a variable speed motor mounted in the frame; a spindle adapted to rotate a coil form holding head mounted on the frame; belt and pulley means connecting said motor to said spindle; an indexing shaft mounted in the frame; worm gears connecting said spindle to said indexing shaft; spindle rotation counting means mounted on the frame coaxial with respect to said indexing shaft; clutch means connecting said counting means to said indexing shaft; brake means mounted on said spindle; and brake and motor control means mounted in the frame and connected with said motor and said brake means for stopping said motor and said spindle in response to a predetermined setting of said counting means, said brake and motor control means including a solenoid connected with said brake means, a cam on said spindle, a first normally open switch closed by said counting means in response to a predetermined number of revolutions of said spindle, a second normally open switch closed by said cam, and wiring connecting said first and second switches and said solenoid in series with a source of electrical energy, whereby said solenoid is energized to actuate said brake means and stop said spindle when said first and second switches are simultaneously closed.

5. Structure as specified in claim 4 in which the counting means includes a pinwheel unit having movable indexing pins; and said brake and motor control including a finger mounted on the frame and moved by selected ones of said pins, said finger having a wing contacting and closing said first normally open switch when said finger is moved by a predetermined one of said pins.

References Cited by the Examiner

UNITED STATES PATENTS

| | | | |
|---|---|---|---|
| 1,884,409 | 10/1932 | Vienneau | 242—9 |
| 2,030,988 | 2/1936 | Hofstetter | 242—9 |
| 2,772,837 | 12/1956 | Carroll | 242—9 |
| 2,846,156 | 8/1958 | Flanagan | 242—9 |
| 2,997,076 | 8/1961 | McVoy | 242—9 |
| 3,106,351 | 10/1963 | Fulton | 242—9 |
| 3,145,939 | 10/1964 | Mason et al. | 242—35.5 |
| 3,166,104 | 1/1965 | Foley et al. | 140—92.2 |

MERVIN STEIN, *Primary Examiner.*

B. S. TAYLOR, *Assistant Examiner.*